(No Model.)

W. HOOEY & J. W. BAILEY.
MACHINE FOR DESTROYING POTATO BUGS.

No. 383,294. Patented May 22, 1888.

Witnesses.
J. M. Jackson.
J. Edw. Maybee.

Inventors
Wilbert Hooey.
John W. Bailey.
by
Donald C. Ridout & Co.
attys

UNITED STATES PATENT OFFICE.

WILBERT HOOEY, OF TORONTO, AND JOHN WILLIAM BAILEY, OF CARTWRIGHT, ONTARIO, CANADA.

MACHINE FOR DESTROYING POTATO-BUGS.

SPECIFICATION forming part of Letters Patent No. 383,294, dated May 22, 1888.

Application filed October 20, 1887. Serial No. 252,911. (No model.)

*To all whom it may concern:*

Be it known that we, WILBERT HOOEY, of the city of Toronto, in the county of York, in the Province of Ontario, Canada, manufacturer, and JOHN WILLIAM BAILEY, of Cartwright P. O., in the county of Durham, in the Province of Ontario, farmer, have jointly invented a certain new and useful Improved Device for Destroying Potato-Beetles, of which the following is a specification.

The object of the invention is to provide a machine which will rapidly and effectually remove from the plants and destroy potato-beetles in such a manner as to dispense with the use of paris green or other poisonous material; and it consists, essentially, of a barrow-shaped frame, the wheel on which carries a cogged ring which meshes with a spur-pinion on the end of a shaft, from which motion is derived for inwardly-revolving beaters which sweep the potato-beetles off the plants as the machine is wheeled between the rows, and the beetles, falling on downwardly-inclined boards, are carried to two inwardly-revolving rollers, between which they are crushed to a pulp, as hereinafter particularly described.

Figure 1:
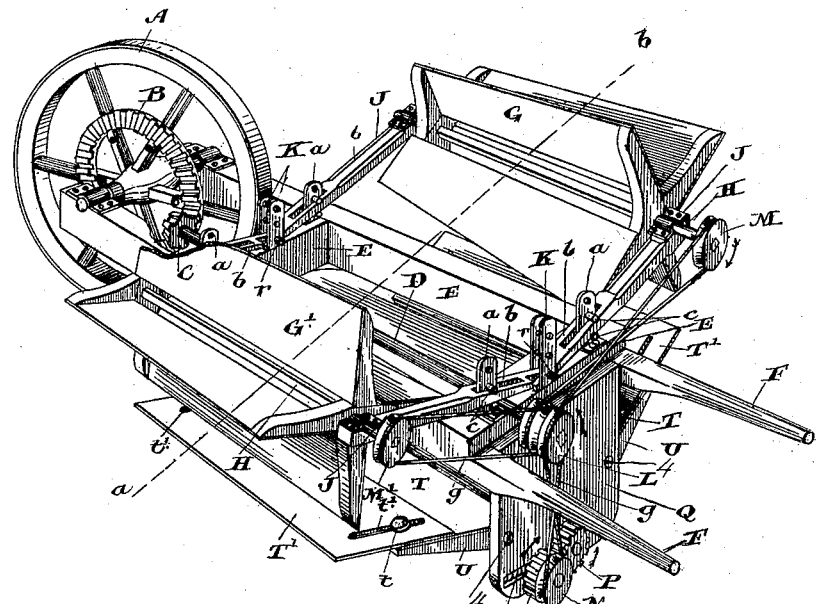
Figure 2:
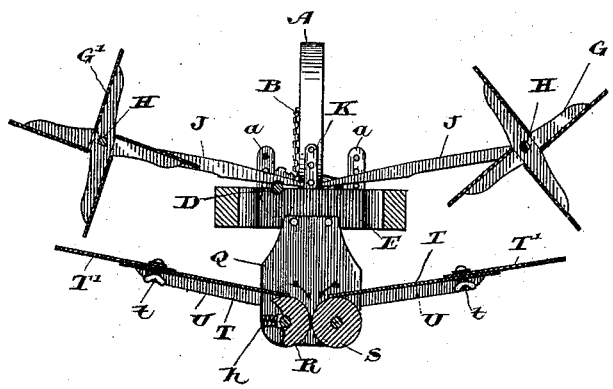

Figure 1 is a perspective view of our improved device. Fig. 2 is a cross section through the line *a b* in Fig. 1.

In the drawings like letters of reference indicate similar parts in the different figures.

In Fig. 1, A is a wheel of ordinary construction, and B is a bevel-gear ring formed thereon.

C is a spur-pinion formed on the end of main shaft D, which is suitably journaled on the frame E. One of the wings of beaters is broken away so as to show the spur-pinion, C.

F are the handles to move the machine. G G' are beaters, and H spindles therefor, which are journaled on the arms J. These arms J are made adjustable as to height and distance apart by means of the standards *a* in the slots *b*, formed in the arms J, and the pins *c*, adapted to pass through holes in these standards.

K K is a vertical sleeve centrally placed, and attached to the frame E at the front and rear ends thereof, and adapted by means of pins *r* and pin-holes to secure adjustably the ends of the arms J for the beaters G G', which can be raised or lowered to suit the height of the plants which are to be cleaned of beetles. These beaters G G' have preferably four wings, made of some light wood or other suitable material, and which are beveled off to the front, as shown, so as to better reach the tops of the plants.

L is a double pulley on the end of the shaft D, having a rope or belting, *g*, to drive the pulleys M' M on the ends of the spindles H for beaters; and N is a pulley formed in the pinion-wheel O, which meshes with pinion-wheel P. These pinion-wheels O and P are held in gear by the spring *h*, working in a slot formed in the end frame-piece, Q, and against the spindle of gear-pinion O. These gear-pinions O and P actuate the crushing-rollers R and S, cross-sections of which are shown in Fig. 2, and which rotate inwardly, as shown by the arrow-heads. The direction of the motion of these pulleys and gear-pinions on the rear end of the machine is also indicated by arrow-heads.

T are inclined tables fixed to the brackets U, which are in front and rear, Fig. 2 showing front brackets, and T' are leaves adjustably held thereon by set-screws *t* in the slots *t'*. A greater or less pitch may be given to these inclined tables by altering the set of the brackets U by simply loosening the screws 4, adjusting the brackets to the desired position, and then tightening the screws.

From the foregoing description the mode of operation may be readily understood. As the machine is wheeled between the rows of potatoes, the spur-pinion C meshes with the gear-ring B on the wheel A, causing the shaft D to revolve, which drives the beaters G G' by means of suitable pulleys and belts, as well as the crushing-rollers R and S, the beaters revolving inwardly and sweeping the beetles from the potato-plants onto the inclined tables and leaves T T', whence they fall between the crushing-rollers R and S and are at once mashed up. This mode of destroying potato-beetles is very effective and much more rapid than the usual and dangerous mode of using paris-green or other poisonous ingredient.

What we claim as our invention is—

1. In a machine for destroying potato-beetles, the combination, with a wheel suitably journaled and provided with a bevel-gear ring, of a spur-pinion adapted to mesh with said gear-ring and to drive a shaft and a pulley thereon, which actuate by means of belting and pulleys inwardly-rotating beaters journaled in arms adjustably connected with the frame of the machine, inclined tables below said beaters, adjustable laterally and radially on said frame, and designed to direct the beetles swept from the plants to two inwardly-rotating rollers driven by spur-pinions meshing into each other, one of which derives motion by pulley and belting connected with a pulley on the main shaft of the machine, substantially as specified.

2. The combination of wheel A, journaled on frame E, cogged ring B on said wheel, spur-pinion C, main shaft D, carrying said pinion, double pulley L on said shaft, rope $g$, pulleys M M', adjustable arms J, attached to said frame E, beaters G G' on spindles H, which are journaled on said arms, inclined table T, with adjustable leaves T', brackets U, adjustable as described, crushing-rollers R and S, gear-pinion P, meshing with gear-pinion O, which latter is driven by power communicated from the main shaft to pulley N, and spring $h$, formed in slot in end frame-piece, Q, and handles F, substantially as described and specified.

3. In combination with the frame of a machine for destroying potato-beetles, arms J, secured to and extending laterally from the frame, and slotted to receive standards $a$, which are pierced for pins $c$, and sleeve K, rising from the ends of the frame, slotted and similarly pierced for retaining-pins $r$, the beaters G G', journaled on said arms J, and revolving inwardly by power communicated from the main shaft D of the machine, substantially as specified.

4. The combination, with a device for destroying beetles with the crushing-rollers R and S, suitably journaled, of gear-pinions O and P at the discharge of the tables, and spring $h$, formed in the slot in end frame-piece, Q, pulley N, driven by power communicated from main shaft D, inclined tables T, brackets U, adjustable on said frame, and leaves T', adjustably connected with tables T by set-screws $t$ in slots $t'$, substantially as described, and for the purpose specified.

5. In a machine for destroying potato-beetles, the combination of the beveled beater G, journaled in the arm J, adjustably connected to the frame of the machine and adapted to rotate inwardly by power communicated from the main shaft D, which is actuated by bevel-gear connected with the road-wheel A, and inclined table T, adjustable laterally and radially on said frame, and designed to forward the beetles swept from the plants to the crushing-rollers O and P, which are also driven by power communicated from the main shaft D, substantially as specified.

Signed by the said WILBERT HOOEY at Toronto this 9th day of August, 1887.

WILBERT HOOEY.

In presence of—
JOHN G. RIDOUT,
CHARLES C. BALDWIN.

Signed by the said JOHN W. BAILEY at Cartwright P. O., this 15th day of August, 1887.

JOHN W. BAILEY.

In presence of—
JOHN BLAKNY,
F. M. ARNOLD.